United States Patent
Kestle

(10) Patent No.: US 7,449,139 B2
(45) Date of Patent: Nov. 11, 2008

(54) MOLDING-SYSTEM PLATEN ACTUATOR

(75) Inventor: Martin Richard Kestle, Everett (CA)

(73) Assignee: Husky Injection Molding Systems Ltd., Bolton, On (CA)

( * ) Notice: Subject to any disclaimer, the term of this patent is extended or adjusted under 35 U.S.C. 154(b) by 201 days.

(21) Appl. No.: 11/438,994

(22) Filed: May 23, 2006

(65) Prior Publication Data

US 2007/0273059 A1 Nov. 29, 2007

(51) Int. Cl.
B29C 45/68 (2006.01)
B22D 17/26 (2006.01)

(52) U.S. Cl. .............. 264/334; 164/137; 164/343; 425/441; 425/451.7; 425/589

(58) Field of Classification Search .......... 264/299, 264/319, 328.1, 334; 425/589, 441, 450.1, 425/451.7; 164/137, 342, 343
See application file for complete search history.

(56) References Cited

U.S. PATENT DOCUMENTS

| | | | |
|---|---|---|---|
| 3,191,235 A * | 6/1965 | Rougement | 425/451.7 |
| 3,704,973 A * | 12/1972 | Renfrew et al. | 425/451.7 |
| 5,261,810 A * | 11/1993 | Kamp et al. | 425/451.9 |
| 5,336,462 A | 8/1994 | Wohlrab | |
| 5,345,766 A * | 9/1994 | Leonhartsberger et al. | 60/545 |
| 5,753,153 A | 5/1998 | Choi | |
| 5,922,372 A | 7/1999 | Schad | |
| 6,093,361 A | 7/2000 | Schad | |
| 6,179,607 B1 | 1/2001 | Inaba et al. | |
| 6,186,770 B1 | 2/2001 | Ziv-Av | |
| 6,200,123 B1 | 3/2001 | Mailliet et al. | |
| 6,210,144 B1 | 4/2001 | Mailliet et al. | |
| 6,250,905 B1 | 6/2001 | Mailliet et al. | |
| 6,439,875 B1 * | 8/2002 | Morita et al. | 425/595 |
| 6,719,553 B1 | 4/2004 | Hehl | |
| 6,821,463 B2 | 11/2004 | Di Dio et al. | |
| 6,835,061 B1 * | 12/2004 | Hehl | 425/589 |
| 6,935,111 B2 * | 8/2005 | Dantlgraber | 60/565 |
| 6,971,237 B2 * | 12/2005 | Geiger | 60/545 |
| 6,984,121 B2 | 1/2006 | Fischbach et al. | |

* cited by examiner

Primary Examiner—James Mackey

(57) ABSTRACT

Disclosed is a molding-system platen actuator, including: (a) a platen-stroke actuator including: an electrical actuator, and a guide bushing being connected with the electrical actuator; and (b) a mold-break actuator being in-line with the platen-stroke actuator, the mold-break actuator including: a hydraulic actuator having: a piston being strokable along an in-line housing, and air pressure being generatable between the piston and the guide bushing, and the air pressure being useable to push the piston backwardly.

53 Claims, 7 Drawing Sheets

MOLDING-SYSTEM PLATEN ACTUATOR

TECHNICAL FIELD

The present invention generally relates to, but is not limited to, molding systems, and more specifically the present invention relates to, but is not limited to, (i) molding-system platen actuator, (ii) a molding system having a molding-system platen actuator, and/or (iii) a method of a molding-system platen actuator, amongst other things.

BACKGROUND

U.S. Pat. No. 5,336,462 (Inventor: Wohlrab; Published: 1994 Aug. 9) discloses an injection mold that has two locking cylinders with pistons, high speed layout, and pressure transmission system, coupled hydraulically.

U.S. Pat. No. 5,753,153 (Inventor: Choi; Published: 1998 May 19) discloses a control system for clamp-up and mold-break operations of tie bar clamping mechanisms, which can determine and adjust starting position of securing/clamping mechanism and movable mould after each molding operation to achieve greater accuracy.

U.S. Pat. No. 5,922,372 (Inventor: Schad; Published: 1999 Jul. 13) discloses a molding-machine platen clamping system that includes columns fixed to a moving platen with teeth engaged by a hydraulic clamping system. This patent was reissued on 3 Sep. 2002 as patent USRE37827.

U.S. Pat. No. 6,179,607 (Inventor: Inaba et al; Published: 2001 Jan. 30) discloses a two-platen type mold damper that includes rotating ball nuts moving relative to platen which reciprocates relative to fixed platen.

U.S. Pat. No. 6,200,123 (Inventor: Mailliet et al; Published: 2001 Mar. 13) discloses a hydraulic-closure unit in a pressure injection molding machine. The unit combines double-acting annular cylinder with breech-action locking which allows relative sliding of pressure rod and turns to engage inner and outer threads, taking up play and arriving at force transmission position.

U.S. Pat. No. 6,186,770 (Inventor: Ziv-Av; Published: 2001 Feb. 13) discloses a clamping assembly for an injection-molding machine, and the clamping assembly includes a pair of tie bars with threads which engage with threaded bushings in platens by relative rotation of tie bar and platens generated by an actuation system.

U.S. Pat. No. 6,210,144 (Inventor: Mailliet et al: Published: 2001 Apr. 3) discloses a closure unit for injection-molding machines, which allows free sliding of a moving platen. The closure unit includes double-acting hydraulic cylinders on a fixed platen which act through locking bushes onto tie rods with interrupted threads which are engaged whilst taking up backlash by turning.

U.S. Pat. No. 6,250,905 (Inventor: Mailliet et al; Published: 2001 Jun. 26) discloses an injection-molding machine closure unit that has locking bushes on tie bars between fixed and moving platens, and the locking bushes engage with threads on bars to absorb backlash and to transmit a closure force from double-acting hydraulic cylinders.

U.S. Pat. No. 6,719,553 (Inventor: Hehl; Published: 2004 Apr. 13) discloses a slide-bar or C-frame pressure injection molding machine.

U.S. Pat. No. 6,821,463 (Inventor: Di Dio et al; Published: 2004 Nov. 23) discloses clamping of molds in an injection molding press by supporting tie-rods sliding with respect to platens, providing locking bush for the tie-rod, moving platen, and inter engaging screw threaded portions of tie-rods and locking bushes.

U.S. Pat. No. 6,984,121 (Inventor: Fischbach et al; Published: 2006 Jan. 10) discloses a mold-clamping plate for an injection-molding machine consists of central plate with sleeves at its corners which surround bores for spindles of spindle drive, sleeves being only partially connected to plate.

SUMMARY

According to a first aspect of the present invention, there is provided a molding-system platen actuator, including: (a) a platen-stroke actuator including: an electrical actuator, and a guide bushing being connected with the electrical actuator; and (b) a mold-break actuator being in-line with the platen-stroke actuator, the mold-break actuator including: a hydraulic actuator having; a piston being strokable along an in-line housing, and air pressure being generatable between the piston and the guide bushing, and the air pressure being useable to push the piston backwardly.

According to a second aspect of the present invention, there is provided a molding-system platen actuator, including: (a) a platen-stroke actuator including: an electrical actuator, and a guide bushing being connected with the electrical actuator; and (b) a mold-break actuator being in-line with the platen-stroke actuator, the mold-break actuator including: a hydraulic actuator having; a piston being strokable along an in-line housing, and air pressure being generatable between the piston and the guide bushing, and the air pressure being useable to push the piston backwardly.

According to a third aspect of the present invention, there is provided a method of molding-system platen actuator, the method including: (a) placing a mold-break actuator in-line with a platen-stroke actuator, the platen-stroke actuator including: (i) an electrical actuator, and (ii) a guide bushing being connected with the electrical actuator, and the mold-break actuator including a hydraulic actuator having a piston being strokable along an in-line housing: and (b)generating air pressure between the piston and the guide bushing, and the air pressure pushing the piston backwardly.

According to a fourth aspect of the present invention, there is provided a molded article manufactured by a molding-system platen actuator, having a platen-stroke actuator including an electrical actuator, and also having a mold-break actuator including a hydraulic actuator, the mold-break actuator being in-line with the platen-stroke actuator.

According to a fifth aspect of the present invention, there is provided a molded article manufactured by a molding system, including a molding-system platen actuator, having a platen-stroke actuator including an electrical actuator, and also including a mold-break actuator including a hydraulic actuator, the mold-break actuator being in-line with the platen-stroke actuator.

A technical effect, amongst other technical effects, of the aspects of the present invention is: (i) reduction in cost in sharp contrast to using only an electrical actuator, and (ii) improved accuracy and efficiency in sharp contrast to using only a hydraulic actuator.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
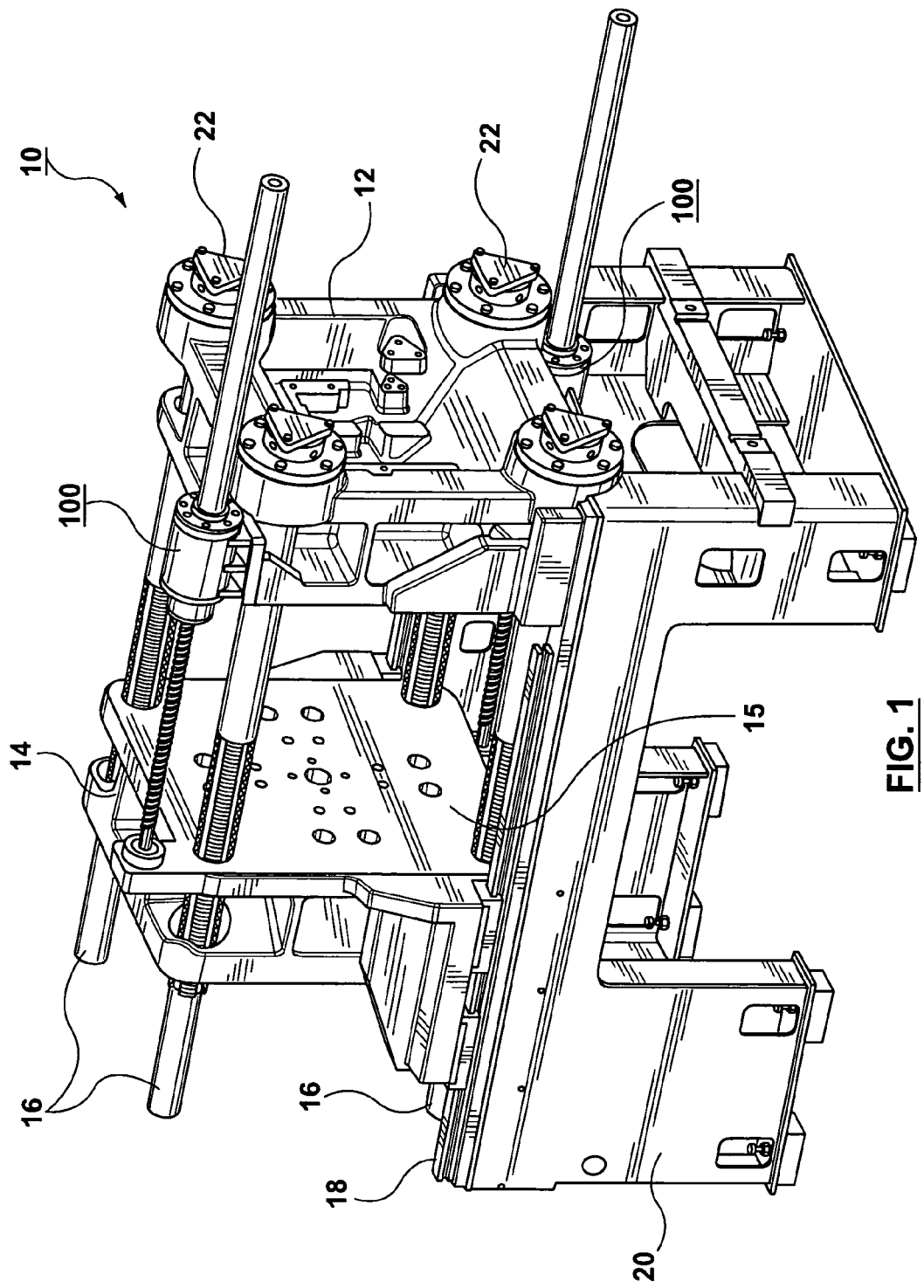
FIG. 1 is a perspective view of a molding-system platen actuator according to a first exemplary embodiment.

FIG. 1 is a perspective view of a molding-system platen actuator 100 (hereafter referred to as "the MSP actuator 100") according to the first exemplary embodiment. The MSP actuator 100 is used to: (i) apply a stroke force so as to stroke platens (such as a movable platen 14 and a stationary platen 12) of a molding system 10 (partially depicted), and (ii) apply a mold break force to the platens so as to break apart (i.e. separate) a mold (sometimes called a mold set) held between the platens after an article has been molded. The molding system 10 is used to manufacture molded articles (not depicted) such as: (i) a completed article that requires no further processing, (ii) a preform that requires further processing, and/or (iii) a completed article that is requires further processing to place it in its closed or other position. Examples of the molding system 10 are: (i) the HyPET™ System, (ii) the Quadloc™ System, (iii) the Hylectric™ System, and (iv) the Magnesium Molding System, all manufactured by Husky Injection Molding Systems Limited (Location: Bolton, Ontario, Canada; WWW-URL: www.husky.ca).

The molding system 10 includes a frame 20. The stationary platen 12 is operatively mounted to the frame 20. Guide rails 18 are supported by the frame 20, and the movable platen 14 is mounted so as to be slidable along the guide rails 18 toward and away from the stationary platen 12. Tie bars 16 extend from the stationary platen 12 toward the movable platen 14, and the movable platen 14 is slidably engageable with the tie bars 16. The movable platen 14 has a mold-bearing surface 15 to which a mold half (not depicted) may be removably mounted thereto. Similarly, the stationary platen 12 has a mold-bearing face (hidden in this view) to which another mold half may be fixedly mounted. A clamping actuator 22 is used to apply a clamp-up force to the mold halves (via the tie bars 16) after the MSP actuator 100 has stroked the platens 12, 14 so that the mold halves may become closed against each other. An injection unit (not depicted in this view) is used to inject a molding material into a cavity defined by the mold halves to form a molded article. Once the molded article is formed and solidified in the mold cavity, the MSP actuator 100 is used to: (i) apply a mold-break force to the platens 12, 14 so as to break open the mold halves, and then (ii) stroke the platens 12, 14 apart after which the molded article may be removed from the mold halves. Then, the mold may be closed for the next cycle of the molding system.

Preferably, two MSP actuators 100 are used such as: (i) a first actuator is located above the stationary platen 12, and (ii) a second actuator is located below the stationary platen 12 (at opposite corners of the platens) so as to: (i) improve stoke movement of the platens 12, 14 and (ii) maintain the mold-bearing surfaces substantially parallel while the platens 12, 14 are stroked. It will be appreciated that one, two or more MSP actuators may be used as may be needed depending on the requirements imposed by a molding system.

Figure 2:
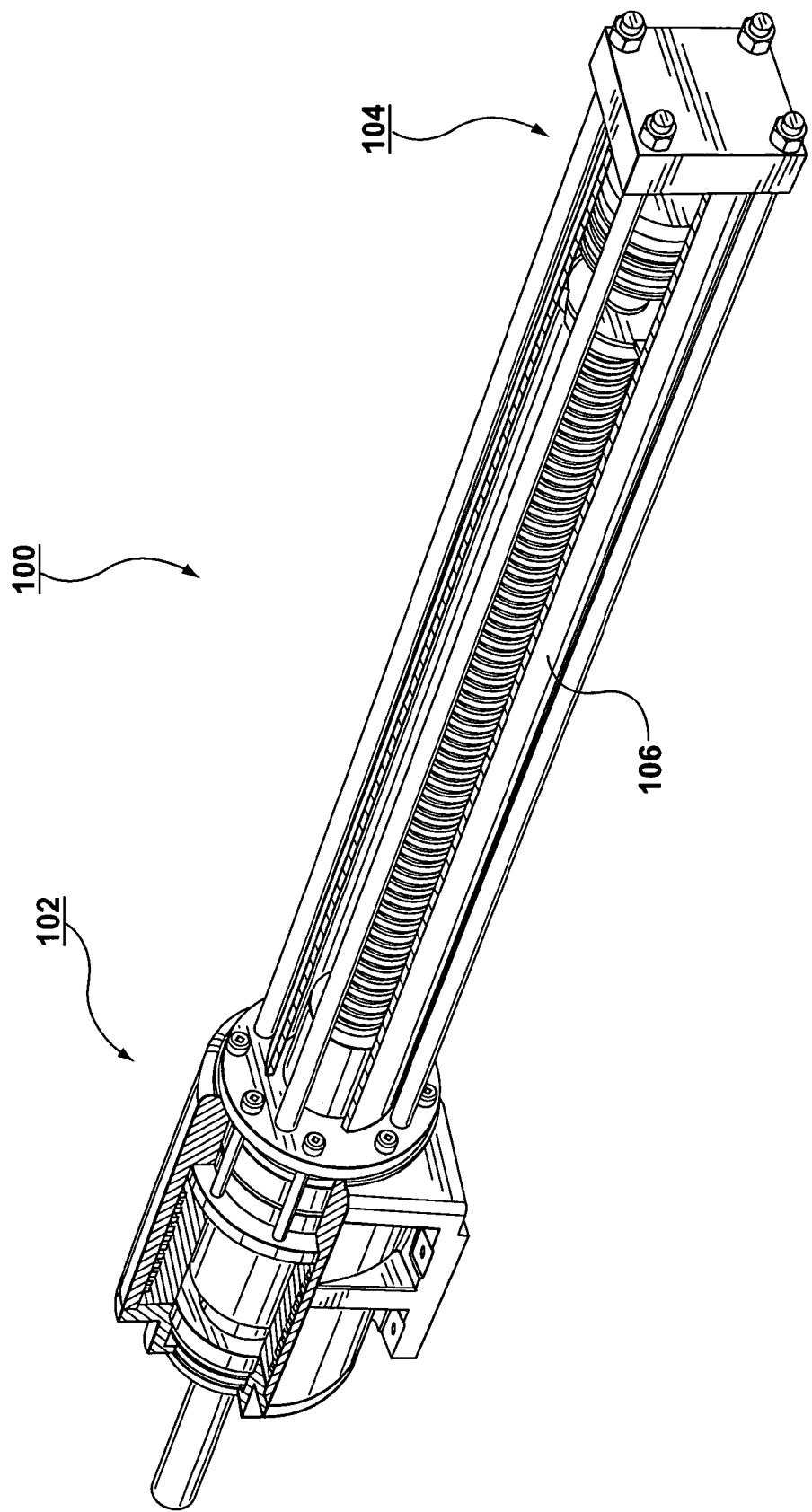
FIG. 2 is another perspective view of the molding-system platen actuator of FIG. 1, in which the molding-system platen actuator has a platen-stroke actuator and also has a mold-break actuator.

FIG. 2 is another perspective view of the molding-system platen actuator 100 of FIG. 1. The MSP actuator 100 includes: (i) a platen-stroke actuator 102 (hereafter referred to as "the PS actuator 102"), and (ii) a mold-break actuator 104 (hereafter referred to as "the MB actuator 104") that operates in-line with the PS actuator 102. Preferably, the PS actuator 102 and the MB actuator 104 share an in-line housing 106 that extends between the PS actuator 102 and the MB actuator 104. In-line means that the MB actuator 104 shares an axis of operation with the PS actuator 102. In-line includes the concept that the MB actuator 104 and the PS actuator 102 share a common axis of operation. A technical effect, amongst other technical effects, is that the electrical actuator may be sized sufficiently large enough to stroke a platen without having to oversize the electrical actuator in order for the electrical actuator to output a (large) mold break force (because the mold break force is applicable by the hydraulic actuator).

Figure 3:
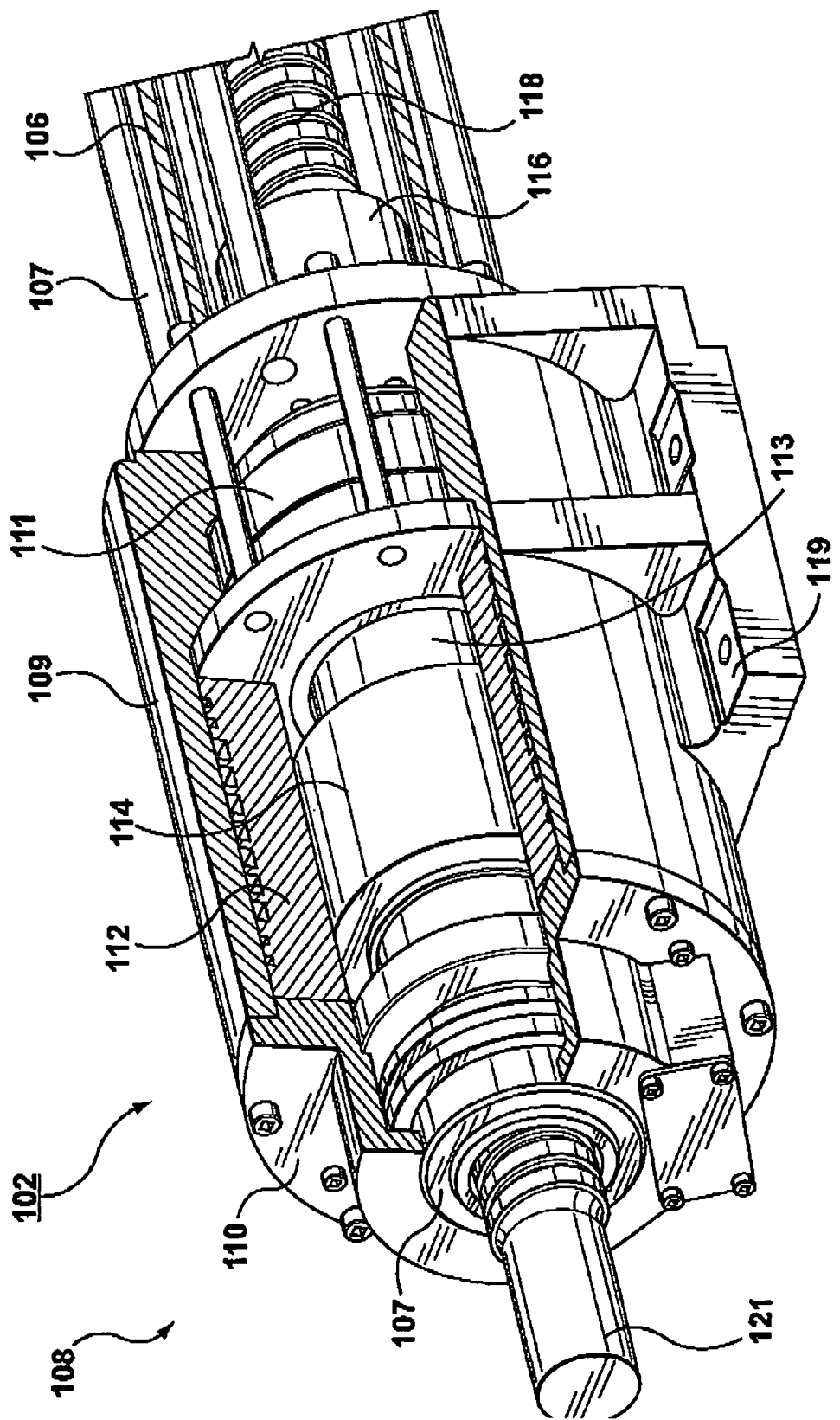
FIG. 3 is a perspective view of the platen-stroke actuator of FIG. 2.

FIG. 3 is a perspective view of the PS actuator 102 of FIG. 2. The PS actuator 102 includes components that are arranged to actuatably impart a platen-stroking force to a platen (either to the stationary platen 12 or to the movable platen 14). Preferably, the PS actuator 102 includes an electric motor 110 (hereafter referred to at "the electric motor 110") that has: (i) a stator 112, and (ii) a rotor 114. Preferably, the electric motor 110 is a hollow-shaft electric motor. The electric motor 110 is generally known as an electrical actuator 108. A motor housing 109 houses the stator 112 so that, in effect, the stator 112 is preferably linkable (via a connection point 121) to the stationary platen 12. The rotor 114 is used to actuatably rotate a ball nut 116 that is threadably engagable to a ball screw 118, which is preferably a non-rotatable ball screw 118. An equivalent (not depicted) to the ball screw 118 is a roller screw, and an equivalent to the ball nut 116 is planetary roller nut. The ball screw 118 is preferably linkable (vie a connection point 121) to the movable platen 14, and so in this manner the rotor 114 is linked to the movable platen 14. Thrust bearings 111 maintain the rotating nut 116 in axial position when the nut 116 rotates to stroke the screw 118 (which then strokes the platen 14). The in-line housing 106 extends from the electric motor 110. The ball screw 118 is accommodated inside the in-line housing 106. Supports 107 are used to support the in-line housing 106. An end cap 107 is connected to the motor housing 109. The ball screw 118 engages the end cap 107. The end cap 107 includes a bearing that is used to support a hollow shaft 113, and the hollow shaft 113 is connected to the rotor 114.

In operation, the stator 112 and the rotor 114 are energized so that the rotor 114 rotates the ball nut 116. Once the ball nut 116 rotates, the ball nut 116: (i) rotatably travels along the ball screw 118 and (ii) urges the ball screw 118 to linearly stroke.

Figure 4:
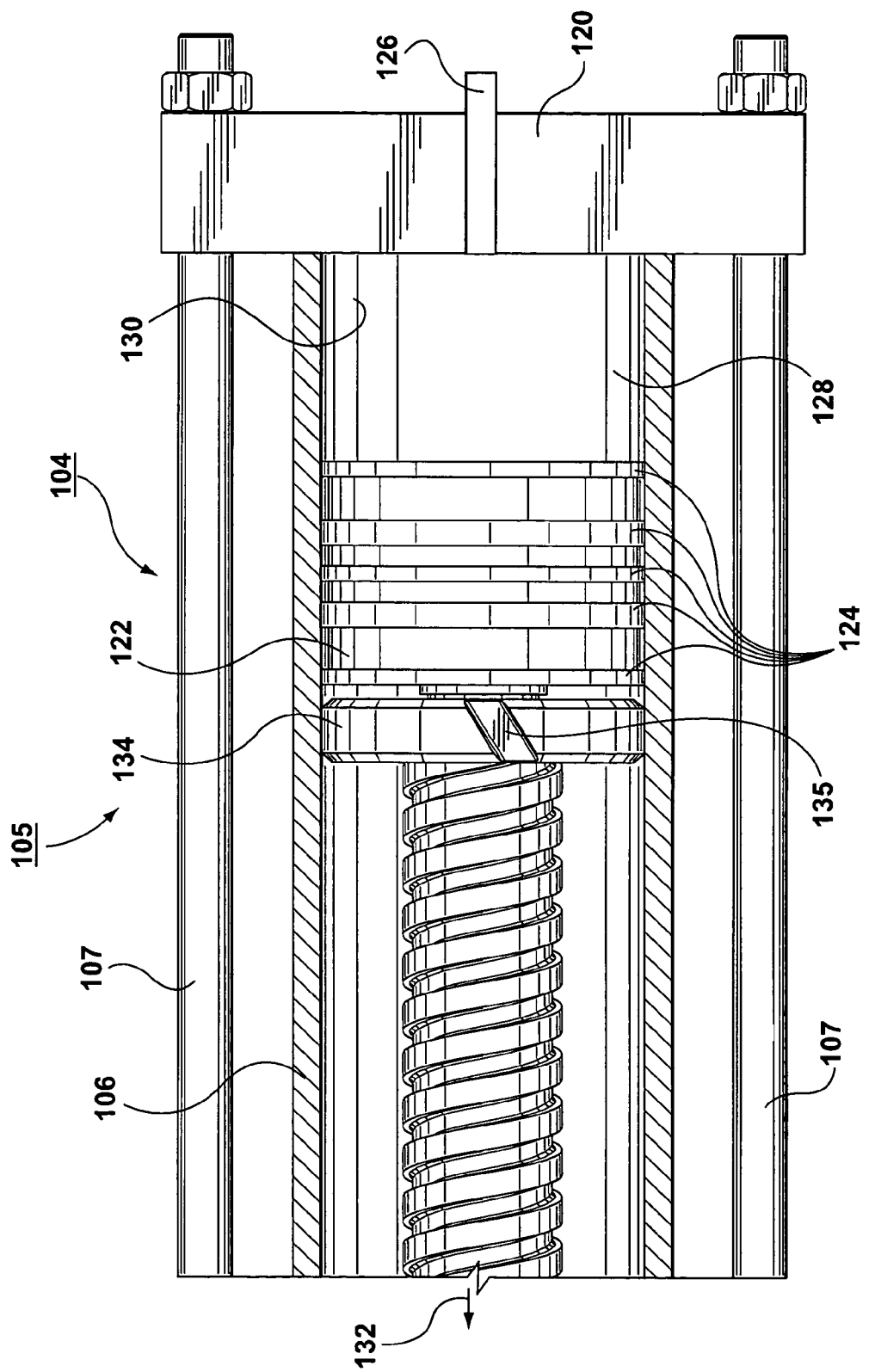
FIGS. 4, 5, 6 and 7 are side views of the mold-break actuator of FIG. 2.

FIGS. 4, 5, 6 and 7 are side views of the MB actuator 104 of FIG. 2. FIG. 4 depicts a condition in which the platens 12, 14 have been stroked closed so that the mold halves are closed, and a molded article has been formed within the mold but the mold-break force 132 has not yet been applied to the mold. The MB actuator 104 is generally known as a hydraulic actuator 105.

Preferably, the MB actuator 104 includes components that are arranged to actuatably impart a mold-break force 132 onto a platen (either the stationary platen 12 or the movable platen 14) so that the mold-break force 132 may be transmitted to the mold. Preferably, a distal end of the in-line housing 106 is sealed with an end cap 120. The supports 107 are used to: (i)

maintain the end cap 120 in place; and/or (ii) improve the structural integrity of the in-line housing 106, which is depicted as a cylinder.

A guide bushing 134 is linked or attached to the end of the ball screw 118. The guide bushing 134 is equipped with a vent 135 that allows air to flow freely between: (i) a space defined between the piston 122 and the guide bushing 134, and (ii) another space defined between the electric motor 110 and the guide bushing 134. According to a variant, a one-way check valve (not depicted) is embedded in the guide bushing 134 and the vent 135 is not used, and this arrangement allows some air pressure to accumulate and act as a bumper to prevent the guide bushing 134 from striking a piston 122 with too much force.

A guide bushing 134 is linked or attached to the end of the ball screw 118. The guide bushing 134 is equipped with a vent 135 that allows air to flow freely between: (i) a space defined between the piston 122 and the guide bushing 134, and (ii) another space defined between the electrical motor 110 and the guide bushing 134. According to a variant, a one-way check valve (not depicted) is embedded in the guide bushing 134 and the vent 135 is not used, and this arrangement allows some air pressure to accumulate and act as a bumper to prevent the guide bushing 134 from striking a piston 122 with too much force.

The piston 122 is slidably mountable within the in-line housing 106, and slidable between the end cap 120 and the ball screw 118. The piston 122 is abuttable against the distal end of the ball screw 118. The piston 122 may be either: (i) attached to the end of the ball screw 118, or (ii) detached from the ball screw 118. When the mold-break force 132 is not required, the piston 122 is not used and it preferably remains positioned in the end of the in-line housing 106.

Located at the end of the in-line housing 106 near the end cap 120 (between the piston 122 and the end cap 120), there is a hydraulic chamber 130 (hereafter referred to as "the chamber 130") to which a pressurized fluid 128 is receivable therein. The port 126 is used to communicate, from a valve (not depicted), pressurized hydraulic fluid 128 with the chamber 130. The port 126 is used to allow the pressurized hydraulic fluid 128 to flow in or out of the in-line housing 106 (preferably at low pressure). Preferably, the port 126 is contained in the end cap 120. A seal 124 is used to: (i) seal the piston 122 against the in-line housing 106 so as to prevent leakage of the hydraulic fluid, but (ii) permit the piston 122 to slide along the in-line housing 106. Alternatively, another port (not depicted) is provided to permit the hydraulic fluid 128 to flow out of the in-line housing 106.

Figure 5:
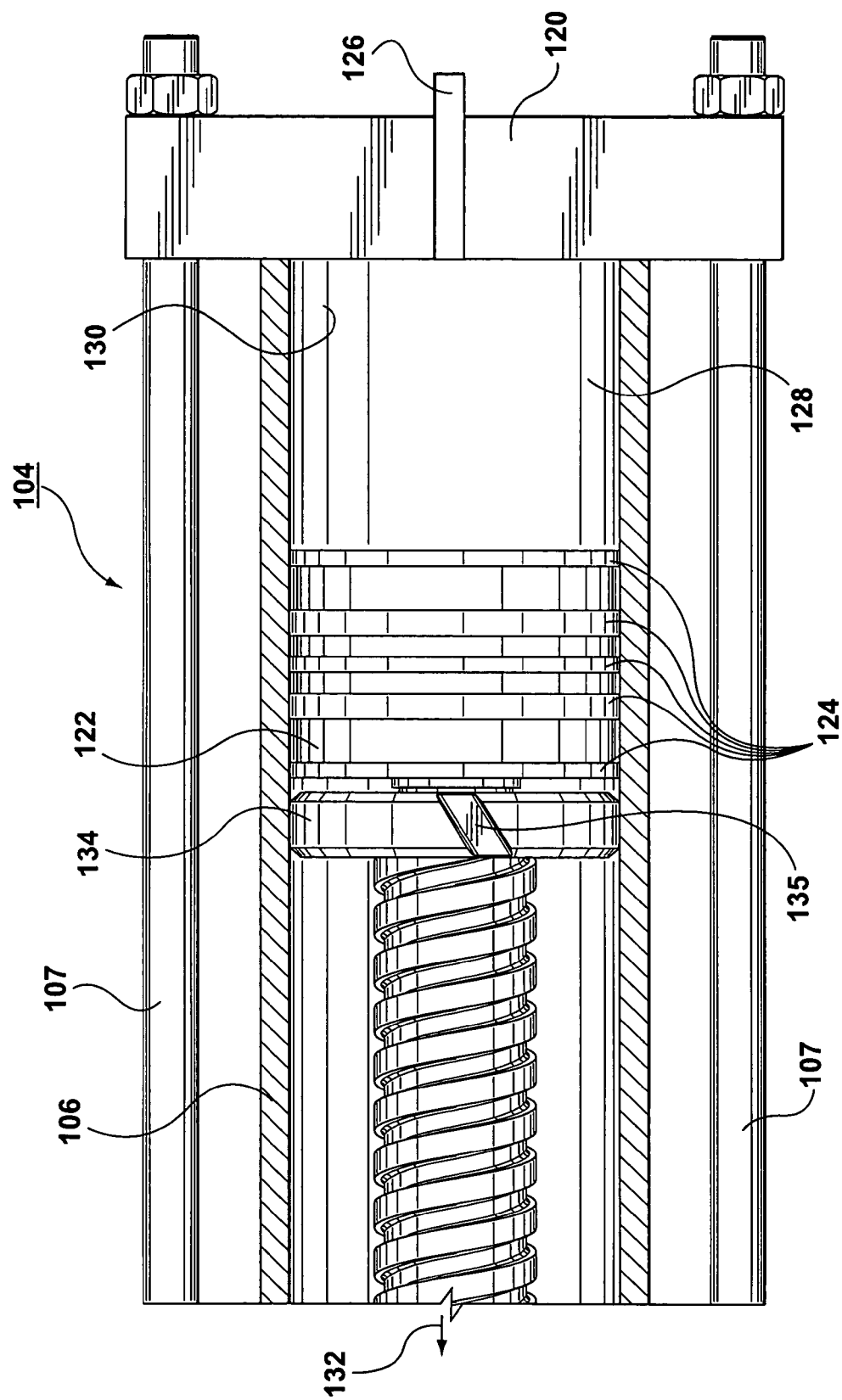

FIG. 5 depicts the MB actuator 104 generating the mold-break force. When the mold-break force is 132 required, the pressurized hydraulic fluid 128 is introduced into the chamber 130 via the port 126. Then, the pressurized hydraulic fluid 128 acts to push the piston 122 against the distal end of the ball screw 118, and in this manner the pressurized hydraulic fluid 128 is used to apply the mold-break force 132 that is required to separate (break open) the mold halves.

Figure 6:
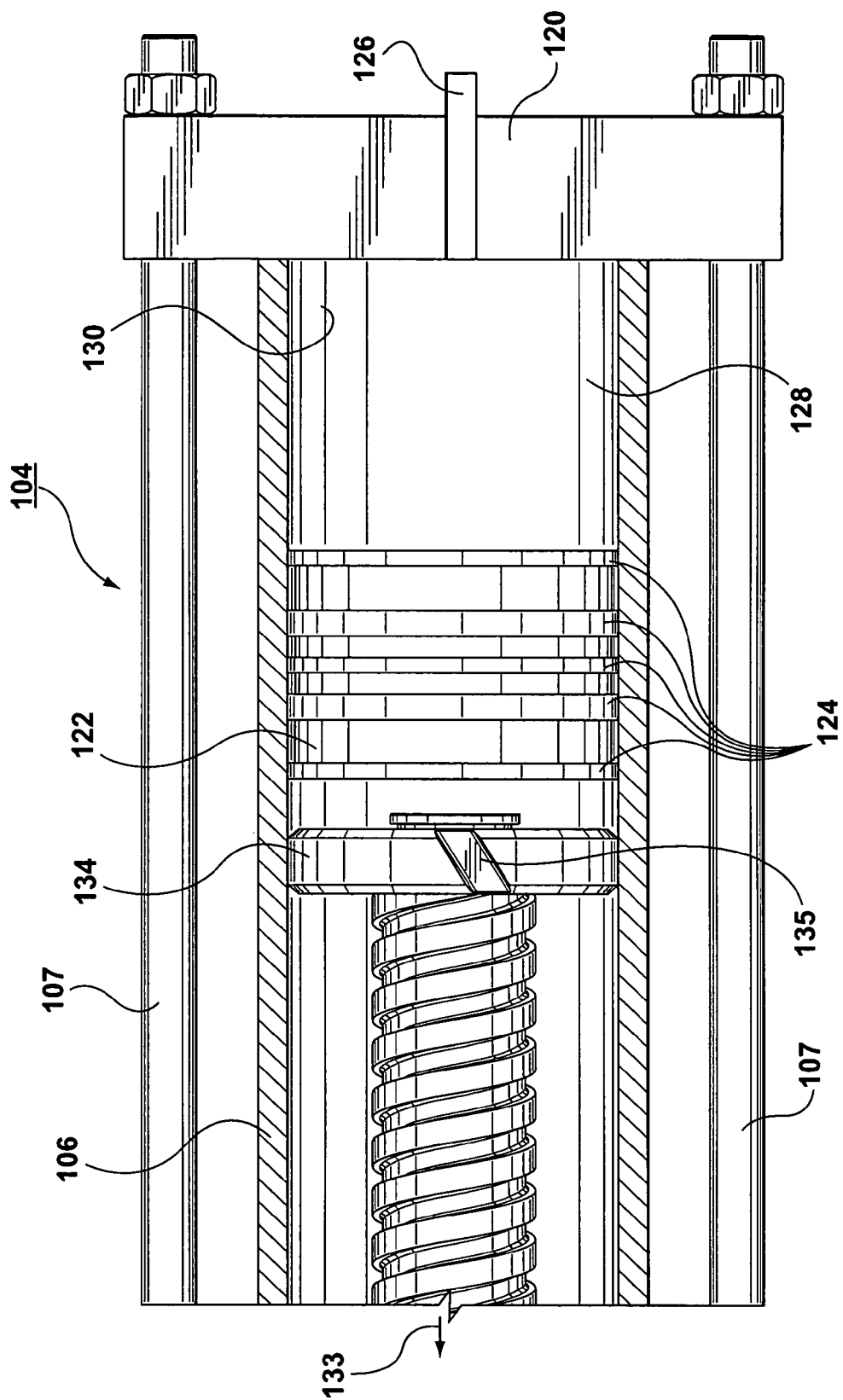

FIG. 6 depicts the MB actuator 104 removing the mold-break force. Once the mold halves have been separated or broken apart, the valve connected to the port 126 is either: (i) closed so as to block flow of hydraulic fluid, or (ii) switched to a low-pressure circuit or connection (such as to a tank, or to atmospheric pressure) so that the pistons are stopped from advancing further.

A decision to stop the flow of pressurized fluid 128 to the chamber 130 may be based on: (i) a position of the mold halves, (ii) a timer indication, and/or (iii) an amount of pressure decay (of the pressurized fluid 128) after the mold halves begin to open (in any combination or permutation thereof). As the mold halves spread apart, the ball screw 118 escapes away from the piston 122.

When the mold halves are closed against each other, the end of the ball screw 118 pushes the piston 122 back towards the end cap 120, exhausting the hydraulic fluid 128 in the chamber 130. The floating piston 122 operates in the portion of the in-line housing 108 which is defined by a closed height of the mold. The floating piston 122 is self-adjusting for mold-height variation.

According to a variant, air pressure is generated between the piston 122 and the guide bushing 134, which could be used to push the piston 122 back or reduce the impact load between the ball screw 118 and the piston 122 during closure of the mold.

According to a variant, the guide bushing 134 or the piston 122 is equipped with a bumper (not depicted) made of a flexible material or a separate spring-loaded assembly to cushion impacts.

Figure 7:
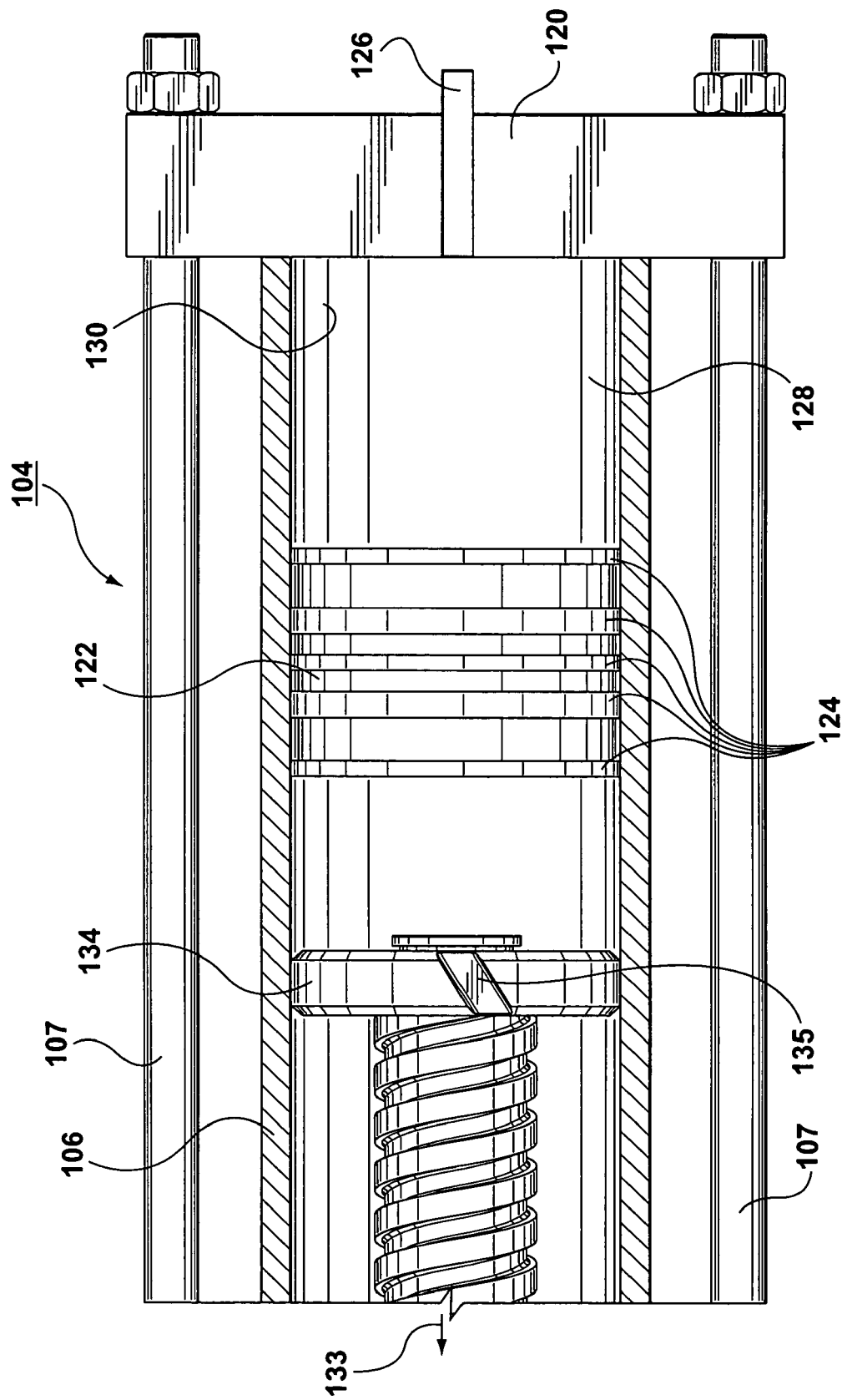

FIG. 7 depicts the rotor 114 having urged the motor housing 109 to translate.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A molding-system platen actuator, comprising:
    a platen-stroke actuator including:
        an electrical actuator, and
        a guide bushing being connected with the electrical actuator; and
    a mold-break actuator being in-line with the platen-stroke actuator, the mold-break actuator including:
        a hydraulic actuator having:
            a piston being strokable along an in-line housing, and air pressure being generatable between the piston and the guide bushing, and the air pressure being useable to push the piston backwardly.

2. The molding-system platen actuator of claim 1, wherein the platen-stroke actuator and the mold-break actuator share the in-line housing.

3. The molding-system platen actuator of claim 1, wherein the electrical actuator is configured to be a hollow-shaft electric motor.

4. The molding-system platen actuator of claim 1, wherein the electrical actuator includes:
    a stator; and
    a rotor being cooperative with the stator.

5. The molding-system platen actuator of claim 1, wherein the electrical actuator includes:
    a stator;
    a rotor being cooperative with the stator;
    a ball nut connected to the rotor; and
    a ball screw being cooperative with the ball nut.

6. The molding-system platen actuator of claim 1, wherein the electrical actuator includes:
    a stator being connectable to a first platen;

a rotor being connectable to a second platen, and the rotor being cooperative with the stator;
a ball nut connected to the rotor; and
a ball screw being cooperative with the ball nut.

7. The molding-system platen actuator of claim 1, wherein the electrical actuator includes:
a stator being connectable to a first platen;
a rotor being connectable to a second platen, and the rotor being cooperative with the stator;
a ball nut connected to the rotor; and
a ball screw being cooperative with the ball nut the first platen includes a stationary platen, and the second platen includes a movable platen.

8. The molding-system platen actuator of claim 1, wherein the electrical actuator includes:
a stator;
a rotor being cooperative with the stator;
a ball nut connected to the rotor; and
a ball screw being cooperative with the ball nut, the ball nut is threadably engagable with the ball screw.

9. The molding-system platen actuator of claim 1, wherein the platen-stroke actuator and the mold-break actuator share the in-line housing, the in-line housing extends from the platen-stroke actuator and the mold-break actuator.

10. The molding-system platen actuator of claim 1, wherein the electrical actuator includes:
a stator;
a rotor being cooperative with the stator;
a ball nut connected to the rotor; and
a ball screw being cooperative with the ball nut, the platen-stroke actuator and the mold-break actuator share the in-line housing, and the ball screw is accommodated inside the in-line housing.

11. The molding-system platen actuator of claim 1, wherein the electrical actuator includes:
a stator;
a rotor being cooperative with the stator;
a ball nut connected to the rotor; and
a ball screw being cooperative with the ball nut, and the ball screw is non-rotatable.

12. The molding-system platen actuator of claim 1, wherein the platen-stroke actuator and the mold-break actuator share the in-line housing, and an end of the in-line housing is sealed with an end cap.

13. The molding-system platen actuator of claim 1, wherein the piston is strokable along the in-line housing between an end cap and the platen-stroke actuator.

14. The molding-system platen actuator of claim 1, wherein the piston includes a seal that seals the piston against the in-line housing.

15. The molding-system platen actuator of claim 1, wherein:
the electrical actuator includes:
a stator;
a rotor being cooperative with the stator;
a ball nut connected to the rotor; and
a ball screw being cooperative with the ball nut; and
the piston is attached to an end of the ball screw.

16. The molding-system platen actuator of claim 1, wherein the mold-break actuator includes:
an end cap, the piston and the end cap define a hydraulic chamber configured to accommodate a hydraulic fluid.

17. The molding-system platen actuator of claim 1, wherein the mold-break actuator includes:
an end cap, the piston and the end cap define a hydraulic chamber being configured to accommodate a hydraulic fluid, the hydraulic chamber includes a port for communicating the hydraulic fluid.

18. The molding-system platen actuator of claim 1, wherein the mold-break actuator includes:
an end cap, the piston and the end cap define a hydraulic chamber being configured to accommodate a hydraulic fluid,
when a mold-break force is not required to break open a mold, the piston is not used and remains in an end of the in-line housing.

19. The molding-system platen actuator of claim 1, wherein the mold-break actuator includes:
an end cap, the piston and the end cap define a hydraulic chamber being configured to accommodate a hydraulic fluid,
when a mold-break force is required:
a pressurized hydraulic fluid is introduced into the in-line housing via a port,
the pressurized hydraulic fluid pushes the piston against the platen-stroke actuator, and the hydraulic fluid is used to apply an additional force that is required to break open a mold.

20. The molding-system platen actuator of claim 1, wherein a mold is broken open, and the platen-stroke actuator departs from the piston.

21. The molding-system platen actuator of claim 1, wherein when a mold is closed, the platen-stroke actuator pushes the piston back towards an end cap to exhaust a hydraulic fluid in a hydraulic chamber, 22. The molding-system platen actuator of claim 1, wherein the piston is configured to operate in a portion of the in-line housing which is defined by a closed height of a mold.

23. The molding-system platen actuator of claim 1, wherein the piston is adjustable for mold-height variation.

24. The molding-system platen actuator of claim 1, wherein the guide bushing is positionable on the platen-stroke actuator.

25. The molding-system platen actuator of claim 1, wherein:
the guide bushing includes:
a one-way check valve, the one-way check valve allows air to flow into a space defined between the piston and the guide bushing.

26. The molding-system platen actuator of claim 1, wherein:
the electrical actuator includes:
a stator;
a rotor being cooperative with the stator;
a ball nut connected to the rotor;
a ball screw being cooperative with the ball nut, and the guide bushing is positionable on an end of the ball screw; and
the air pressure is useable to reduce an impact load between the ball screw and the piston during closure of a mold.

27. A molding system, comprising:
a molding-system platen actuator, including:
a platen-stroke actuator including:
an electrical actuator, and
a guide bushing being connected with the electrical actuator; and
a mold-break actuator being in-line with the platen-stroke actuator, the mold-break actuator including:
a hydraulic actuator having:
a piston being strokable along an in-line housing, and air pressure being generatable between the piston and the guide bushing, and the air pressure being useable to push the piston backwardly.

28. The molding system of claim 27, wherein the platen-stroke actuator and the mold-break actuator share the in-line housing.

29. The molding system of claim 27, wherein the electrical actuator is configured to be a hollow-shaft electric motor.

30. The molding system of claim 27, wherein the electrical actuator includes:
a stator; and
a rotor being cooperative with the stator.

31. The molding system of claim 27, wherein the electrical actuator includes:
a stator;
a rotor being cooperative with the stator;
a ball nut connected to the rotor; and
a ball screw being cooperative with the ball nut.

32. The molding system of claim 27, wherein the electrical actuator includes:
a stator being connectable to a first platen;
a rotor being connectable to a second platen, and the rotor being cooperative with the stator;
a ball nut connected to the rotor; and
a ball screw being cooperative with the bail nut.

33. The molding system of claim 27, wherein the electrical actuator includes:
a stator being connectable to a first platen;
a rotor being connectable to a second platen, and the rotor being cooperative with the stator;
a ball nut connected to the rotor; and
a ball screw being cooperative with the ball nut, the first platen includes a stationary platen, and the second platen includes a movable platen.

34. The molding system of claim 27, wherein the electrical actuator includes:
a stator;
a rotor being cooperative with the stator;
a ball nut connected to the rotor; and
a ball screw being cooperative with the ball nut, the ball nut is threadably engagable the ball screw.

35. The molding system of claim 27, wherein the platen-stroke actuator and the mold-break actuator share the in-line housing, the in-line housing extends from the platen-stroke actuator and the mold-break actuator.

36. The molding system of claim 27, wherein the electrical actuator includes:
a stator;
a rotor being cooperative with the stator;
a ball nut connected to the rotor; and
a ball screw being cooperative with the ball nut, the platen-stroke actuator end the mold-break actuator share the in-line housing, and the ball screw is accommodated inside the in-line housing.

37. The molding system of claim 27, wherein the electrical actuator includes:
a stator;
a rotor being cooperative with the stator;
a ball nut connected to the rotor; and
a ball screw being cooperative with the bail nut, and the ball screw is non-rotatable.

38. The molding system of claim 27, wherein the platen-stroke actuator and the mold-break actuator share the in-line housing, and an end of the in-line housing is sealed with an end cap.

39. The molding system of claim 27, wherein the piston is strokable between an end cap and the platen-stroke actuator.

40. The molding system of claim 27, wherein the piston includes a seal that seals the piston against the in-line housing.

41. The molding system of claim 27, wherein:
the electrical actuator includes:
a stator;
a rotor being cooperative with the stator;
a ball nut connected to the rotor; and
a ball screw being cooperative with the ball nut; and
the piston is attached to an end of the ball screw.

42. The molding system of claim 27, wherein the mold-break actuator includes:
an end cap, the piston and the end cap define a hydraulic chamber being configured to accommodate a hydraulic fluid.

43. The molding system of claim 27, wherein the mold-break actuator includes:
an end cap, the piston and the end cap define a hydraulic chamber being configured to accommodate a hydraulic fluid, the hydraulic chamber includes a port for communicating the hydraulic fluid.

44. The molding system of claim 27, wherein the mold-break actuator includes:
an end cap, the piston and the end cap define a hydraulic chamber being configured to accommodate a hydraulic fluid,
when a mold-break force is not required to break open a mold, the piston is not used and remains in an end of the in-line housing.

45. The molding system of claim 27, wherein the mold-break actuator includes:
an end cap, the piston and the end cap define a hydraulic chamber being configured to accommodate a hydraulic fluid,
when a mold-break force is required:
a pressurized hydraulic fluid is introduced into the in-line housing via a port,
the pressurized hydraulic fluid pushes the piston against the platen-stroke actuator, and the hydraulic fluid is used to apply an additional force that is required to break open a mold.

46. The molding system of claim 27, wherein as a mold is broken open, and the platen-stroke actuator departs from the piston.

47. The molding system of claim 27, wherein when a mold is closed, the platen-stroke actuator pushes the piston back towards an end cap to exhaust a hydraulic fluid in a hydraulic chamber.

48. The molding system of claim 27, wherein the piston is configured to operate in a portion of the in-line housing which is defined by a closed height of a mold.

49. The molding system of claim 27, wherein the piston is adjustable for mold-height variation.

50. The molding system of claim 27, wherein the guide bushing is positionable on the platen-stroke actuator.

51. The molding system of claim 27, wherein the guide bushing includes:
a one-way check valve, the one-way check valve allows air to flow into a space defined between the piston and the guide bushing.

52. The molding system of claim 27, wherein:
the electrical actuator includes:
a stator;
a rotor being cooperative with the stator;
a ball nut connected to the rotor;

a ball screw being cooperative with the ball nut, and the guide bushing is positionable on an end of the ball screw; and the air pressure is useable to reduce an impact load between the ball screw and the piston during closure of a mold.

53. A method of operating a molding-system platen actuator, the method comprising:

placing a mold-break actuator in-line with a platen-stroke actuator, the platen-stroke actuator including: (i) an electrical actuator, and (ii) a guide bushing being connected with the electrical actuator, and the mold-break actuator including a hydraulic actuator having a piston being strokable along an in-line housing; and generating air pressure between the piston and the guide bushing, and the air pressure pushing the piston backwardly.

* * * * *